(12) United States Patent  
Robertson et al.

(10) Patent No.: US 11,809,401 B2  
(45) Date of Patent: Nov. 7, 2023

(54) DATA AGGREGATION SYSTEM

(71) Applicant: International Business Machines Corporation, Armonk, NY (US)

(72) Inventors: Shawn Raymond Robertson, Ontario (CA); Michael Jory, North York (CA)

(73) Assignee: International Business Machines Corporation, Armonk, NY (US)

( * ) Notice: Subject to any disclaimer, the term of this patent is extended or adjusted under 35 U.S.C. 154(b) by 39 days.

(21) Appl. No.: 17/649,700

(22) Filed: Feb. 2, 2022

(65) Prior Publication Data

US 2023/0244651 A1     Aug. 3, 2023

(51) Int. Cl.
*G06F 16/23*     (2019.01)
*G06F 16/25*     (2019.01)

(52) U.S. Cl.
CPC ...... *G06F 16/2358* (2019.01); *G06F 16/2379* (2019.01); *G06F 16/258* (2019.01)

(58) Field of Classification Search
None
See application file for complete search history.

(56) References Cited

U.S. PATENT DOCUMENTS

| | | | |
|---|---|---|---|
| 8,200,664 B2 | 6/2012 | Beier et al. | |
| 8,793,531 B2 | 7/2014 | George et al. | |
| 2006/0173850 A1* | 8/2006 | Auer | G06F 16/273 |
| 2008/0104080 A1 | 5/2008 | Copeland et al. | |
| 2008/0215609 A1 | 9/2008 | Cleveland et al. | |
| 2011/0213775 A1* | 9/2011 | Franke | G06F 16/278 |
| | | | 707/769 |
| 2015/0142991 A1 | 5/2015 | Zaloom et al. | |
| 2015/0347551 A1* | 12/2015 | Shang | G06F 16/273 |
| | | | 707/615 |
| 2016/0275128 A1 | 9/2016 | Dayka et al. | |
| 2018/0046643 A1* | 2/2018 | Brodt | G06F 16/178 |
| 2020/0364185 A1 | 11/2020 | Beier et al. | |
| 2021/0019249 A1 | 1/2021 | Gnaneswaran et al. | |

FOREIGN PATENT DOCUMENTS

| | | |
|---|---|---|
| CN | 101174270 A | 5/2008 |
| CN | 108197135 A | 6/2018 |

OTHER PUBLICATIONS

Raman, Vijayshankar, et al., "DB2 with BLU acceleration: so much more than just a col. store", ACM Proc VLDB Endow, vol. 6, Issue 11, Aug. 2013, pp. 1080-1091. (Year: 2013).*

PCT International Search Report and Written Opinion, dated Mar. 28, 2023, regarding Application No. PCT/CN2023/071109, 8 pages.

* cited by examiner

*Primary Examiner* — Scott A. Waldron
(74) *Attorney, Agent, or Firm* — Yee & Associates, P.C.

(57) ABSTRACT

A computer implemented method aggregates change data. The change data formatted in a byte sequence that is used by a target of the change data is received. The change data is stored in a region in an add buffer in a buffer system in response the change data being for an add operation. A determination is made as to whether a collision is present between the change data and stored change data in the add buffer in response to the change data being for a delete operation. A collision location is stored for the region in the add buffer containing the stored change data corresponding to the collision in response to the collision being present. The stored change data in regions in the add buffer in which a set of collisions is absent is sent to the target in response when the change data is to be applied to the target.

20 Claims, 9 Drawing Sheets

DATA AGGREGATION SYSTEM

BACKGROUND

1. Field

The disclosure relates generally to an improved computer system and more specifically to a method, apparatus, computer system, and computer program product for large-scale data aggregation.

2. Description of the Related Art

Databases, distributed data processing frameworks, and file formats have the highest performance only when data is loaded, inserted, or formatted in bulk. This type of performance can be found in columnar databases, distributed file systems, Parquet data format, event store repositories, and many other types of systems for formats that are targets for data operations. The data to be placed into these bulk oriented targets can take the form of small frequent transactions. These transactions are aggregated into a format that is optimal for these targets. As a result, software is used to aggregate these high-frequency messages into an optimal format for batch or bulk optimized targets. Batching and bulking are techniques to optimize a unit or group of work. A batch optimized target is optimized to process groups of work. A bulk optimized target has improved performance when processing work in groups. Bulk optimized targets have improved performance when processing large amounts of data.

SUMMARY

According to one illustrative embodiment, a computer implemented method aggregates change data. A computer system receives the change data formatted in a byte sequence that is used by a target of the change data. The computer system stores the change data in a region in an add buffer in a buffer system in response the change data being for an add operation. The computer system determines whether a collision is present between the change data and stored change data in the add buffer in response to the change data being for a delete operation. The computer system stores a collision location for the region in the add buffer containing the stored change data corresponding to the collision in response to the collision being present. The computer system sends the stored change data in regions in the add buffer in which a set of collisions is absent to the target in response when the change data is to be applied to the target. According to other illustrative embodiments, a computer system and a computer program product for aggregating change data are provided.

DETAILED DESCRIPTION

Figure 1:
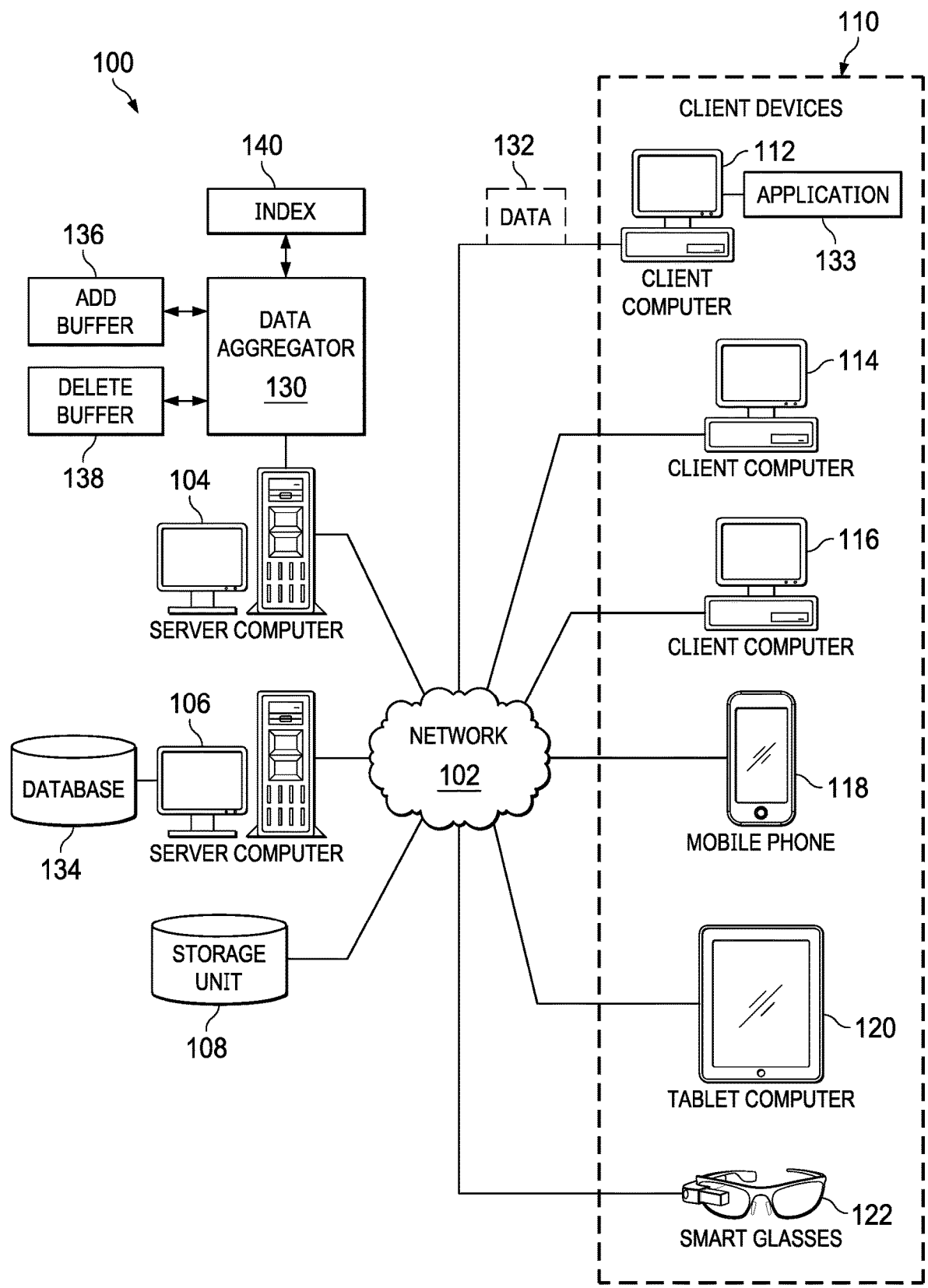
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account a number of different considerations. For example, the illustrative embodiments recognize and take into account that current approaches to aggregation involve storing individual messages for transactions in memory until a threshold is reached. A message is a communication that contain a change made on the source, to be applied to the target object. A transaction is a group of changes to the target object. Individual transactions, or groups of them, are often applied atomically to the target object. In other words, each transaction can be applied atomically.

When the threshold is reached, the accumulated volume is applied. Additional efficiency can be derived by making the batch a "net effect" application of the data. In other words, if a row is to be added and subsequently removed within the same batch, neither of these operations are applied to the target. The illustrative embodiments recognize and take into account that the net effect can be approached by comparing rows to be deleted against rows already added in the target. This approach can be performed by hashing keys or values for efficiency of collision determination and the deleting the delete and add row objects if a collision is present. The update operations can be represented as a sequence of delete and add pairs.

The illustrative embodiments recognize and take into account that current approaches have limits with respect to atomicity and to performance and scalability. For example, with respect to atomicity, the illustrative embodiments recognize and take into account that to ensure that the end target see consistent data, aggregations of transactions are applied on transaction boundaries. At each point of consistency, a decision can be made about whether to apply aggregate data to the target object. This point of consistency can be referred to a consistency point and can be, for example, a transaction boundary. This determination can be whether sufficient data is present to be worthy of submitting for processing. If a decision is made to not apply the aggregated data, operations such as deletes and adds are not processed until the next transaction boundary is seen. This deferral can be performed to increase performance in making changes to the target object.

A decision to continue to accumulate transactions can be incorrect because transactions can vary greatly in size. For example, an additional transaction may exceed target restrictions on transaction size. The additional transaction may have a size that is makes it preferable from a latency perspective to have sent previously accumulated changed data for previous transactions to the target. Once a new transaction begins to be added to the buffers, the operations in the new transaction cannot be undone when a process deletes and adds data within the buffers with multiple writes and delete because the new transaction deletes can remove information regarding the prior state.

With respect to performance scalability, when transactions involve multiple targets, data aggregation can be performed on a per target basis. As each target is optimized for large files and transactions can span many targets such that inherent scalability issues can be present. For example, a limited amount of memory for storing files and transactions can limit scalability. Further, applying many suboptimally small sized accumulations of data is performance inhibiting. Effective scaling can result in using slower storage media such as disk to have sufficient storage for adequately sized accumulations can be generated without exceeding available storage.

When a consistent apply is required, atomicity of transactions is needed. The consistency can be based on the boundaries of the unit of work. If the unit of work entirely encapsulates one or more transactions, those transactions are considered to be consistent because no point in time is present in which the data within the transaction will not be consistent with respect to each other. If data from a single transaction is split across two or more units of work, then the data are said to be inconsistent with respect to each other since only some of the data will be visible, in whatever form that visibility manifests itself, at the time the first unit of work is submitted.

A consistent apply is present when the atomicity of the transaction is to be preserved when changes for the transaction are applied against the target. For example, if a batch of changes being applied against a target includes portion of changes for a transaction, then all those changes are applied in the same batch.

The illustrative embodiments recognize and takes account that the smallest unit of work can be single transaction. As result, if a given transaction is too large for memory, a reliance on a disk to store the contents is present.

The illustrative embodiments recognize and take account that a need for disk backed data buffering can have an impedance mismatch with an aggregation process. Current approaches to net effect aggregation involve using key—value in— memory data structures holding individual operation data to facilitate collision detection. Resolving deletion is more efficient when the specific key—value pair object can be deleted from memory. However, an overhead is present for long-term memory management as the sizes grow and row objects remain in memory beyond short-term thresholds.

When disk is employed, removing deleted operations can become more costly to perform against an add accumulation file for a target. Some techniques orphan deleted data by removing references to the delete data.

When orphaning of data is performed, providing accumulated net effect data requires iteration over individual data rows remaining in the net effect data set. This operation by operation consideration of the remaining data set is sub-optimal from a performance perspective. However, this type of consideration is used to determine what data remains and where that data exists in the buffer in the event the data was buffered.

Thus, with recognition and consideration of these and other factors as described above, a method, apparatus, system, and computer program product are provided for optimizing the application of data without further manipulation after an initial write of the data. In one illustrative example, a computer implemented method aggregates change data. A computer system receives the change data formatted in a byte sequence that is used by a target of the change data. The computer system stores the change data in a region in an add buffer in a buffer system in response the change data being for an add operation. The computer system determines whether a collision is present between the change data and stored change data in the add buffer in response to the change data being for a delete operation. The computer system stores a collision location for the region in the add buffer containing the stored change data corresponding to the collision in response to the collision being present. The computer system sends the stored change data in regions in the add buffer in which a set of collisions is absent to the target in response when the change data is to be applied to the target.

As used herein, a "set of" when used with reference to items means one or more items. For example, a set of collisions is one or more collisions.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program instructions located in network data processing system 100 can be stored on a computer-recordable storage media and downloaded to a data processing system or other device for use. For example, program instructions can be stored on a computer-recordable storage media on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, data aggregator 130 is located in server computer 104. Data aggregator 130 can operate to receive data 132 from application 133 in client computer 112 for application to database 134 in server computer 106. In this example, data 132 can take the form of rows to be applied to tables in database 134. The application of rows can include at least one of an add operation or a delete operation.

As depicted, data aggregator 130 can operate to perform large-scale aggregation of data without buffer manipulation after the initial write for performing delivery of accumulated data on demand. In this illustrative example, data 132 has a format that is used by the targets such as database 134. Data 132 can be a byte sequence of data in the form of rows that can be added to and deleted from database 134.

As depicted, data aggregator 130 stores data 132 in add buffer 136 and delete buffer 138. For example, a row of data 132 that is to be added is stored in add buffer 136, and a row of data to be deleted is stored in delete buffer 138. In some cases, the same row of data can be deleted in data 132 in which the same row of data was added in add buffer 136 from previous receipt of data for aggregation. With the deletion and adding the same row, data is not deleted from either of the buffers. Instead, an invalid region in add buffer 136 for the row that has been deleted is tracked in index 140. This mechanism provides data aggregator 130 to perform net effect aggregation by taking into account when a collision occurs.

For example, when a row is added to add buffer 136, some or all of data 132 in the row is used to create unique identifier for the row. This unique identifier can be a hash of the data in the row. When a row is received for deletion, a hash value can be generated for the row. This hash value can be used to search index 140 for a match. If a match is found, bytes in the row for deletion received in data 132 are compared to bytes for the row stored in in add buffer 136. If a match is present, a collision is present. This collision is present because the same row is being added and deleted.

Rather than delete the row from add buffer 136, data aggregator 130 identifies a region in add buffer 136 where the row in the region collided with the row in data 132 being deleted. The location of this region can be recorded in index 140 as a first offset to the beginning of the data for the row and a second offset to the end of the data for the row in add buffer 136. This location is for a region in which the collision occurred. This region is an invalid region and the data within the region will not be sent to database 134. As a result, only single write of data 132 occurs, after the initial write of data 132, to one of add buffer 136 or delete buffer 138.

Data 132 for the row being deleted that collided the row in add buffer 136 does not need to be stored in delete buffer 138 when a collision is present. In other illustrative examples, this data can be stored in delete buffer 138 with the location of that region being identified in index 140 is an invalid region in which a collision occurred.

When a sufficient amount of data 132 is accumulated in add buffer 136 and delete buffer 138, the data 132 in these database buffers can be sent to database 134. In this illustrative example, the sending data is based on transaction boundaries. A transaction boundary is when one transaction ends. Although transaction boundaries are not required, the use of transaction boundaries can enable the target such as database 134 to know that all of the changes have been received for a particular transaction.

When data 132 is to be applied to the target, data in regions of add buffer 136 identified for sending are sent to the target. These regions exclude a set of regions that have been identified as being invalid in index 140. The same identification is performed for data in delete buffer 138. In this illustrative example, rows being added in delete buffer 138 are sent prior to rows being deleted in add buffer 136 to database 134.

Additionally, checkpoints can also be stored in index 140. Checkpoints enable rolling back to a prior time such that only a portion of the rows in add buffer 136 and delete buffer 138 prior to the checkpoint for the prior time and are sent based on the location of these regions identified by the checkpoint. In this illustrative example, a checkpoint can be set at a consistency point such as a transaction boundary. Other types of consistency points include documents in document-oriented data stores, or buffers of data from non-transactional databases.

The ability to use checkpointing is enabled because data 132 is not deleted from add buffer 136 or delete buffer 138. With checkpointing, the rows in the delete data from the most recent collision can be saved in a buffer until a transaction is complete to enable checkpointing to roll back to a prior transaction.

Thus, when rolling back to a checkpoint, regions in the buffers are placed into groups, a first group containing prior to the checkpoint and a second group containing regions after the checkpoint. When sending data to database 134 based on a checkpoint, the regions prior to the checkpoint in add buffer 136 and delete buffer 138 are sent to database 134 while the regions after the checkpoint in add buffer 136 and delete buffer 138 are not sent to database 134.

Thus, data aggregation provided by data aggregator 130 enables undoing transactions through the process used to store data in add buffer 136 and delete buffer 138 and managing the data based on the identification of regions and collisions within index 140. Further, the process used by data aggregator 130 reduces the need for memory and can provide a desired level performance using buffers backed by disk. This ability to use disk is enabled by writing data once to buffers during the aggregation process in contrast to current techniques that use net effect aggregation.

Further, data aggregator 130 does not require lookahead mechanisms and individual operation data manipulation is avoided as compared to other techniques. Data aggregator 130 does not need to reposition backwards in the buffer, increasing the performance in retrieving data from file backed buffers stored on disk. In this illustrative example, system overhead can be reduced during aggregation by removing memory cleanup of potentially large objects corresponding to the data of each operation. The regions in the buffers and index are reusable during the process and data in the buffers can be overridden once the data is sent to the target.

Thus, data aggregator 130 employs indexing, write-once, nondestructive deletes, and region view of data in buffers. This process employed by data aggregator 130 enables data to be written out of order and in parallel to a target while maintaining consistency in applying the changes in the data aggregated to the target. Further, the storing of unique identifier such as hashes for data in the regions reduces the need to read the buffers until the data is to be sent to the target.

Figure 2:
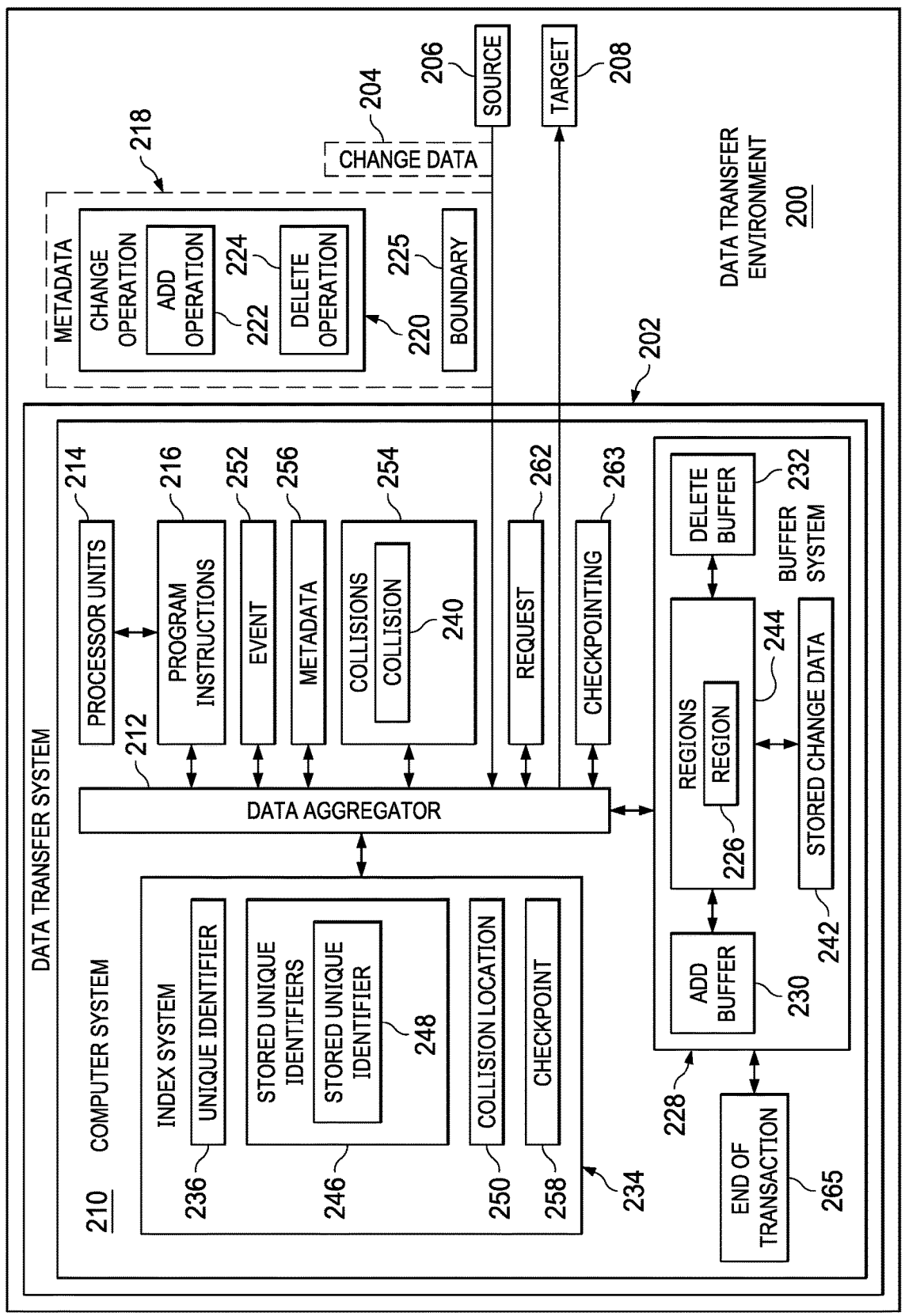
FIG. 2 is a block diagram of a data aggregation environment in accordance with an illustrative embodiment.

With reference now to FIG. 2, a block diagram of a data aggregation environment is depicted in accordance with an illustrative embodiment. In this illustrative example, data aggregation environment 200 includes components that can be implemented in hardware such as the hardware shown in network data processing system 100 in FIG. 1.

In this illustrative example, data aggregation environment 200 comprises data transfer system 202 which can receive change data 204 from source 206 for transfer to target 208. In this illustrative example, data transfer system 202 comprises computer system 210 and data aggregator 212.

Data aggregator 212 can be implemented in software, hardware, firmware or a combination thereof. When software is used, the operations performed by data aggregator 212 can be implemented in program instructions configured to run on hardware, such as a processor unit. When firmware is used, the operations performed by data aggregator 212 can be implemented in program instructions and data and stored in persistent memory to run on a processor unit. When hardware is employed, the hardware can include circuits that operate to perform the operations in data aggregator 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

As depicted, computer system 210 includes a number of processor units 214 that are capable of executing program instructions 216 implementing processes in the illustrative examples. As used herein a processor unit in the number of processor units 214 is a hardware device and is comprised of hardware circuits such as those on an integrated circuit that respond and process instructions and program code that operate a computer. When a number of processor units 214 execute program instructions 216 for a process, the number of processor units 214 is one or more processor units that can be on the same computer or on different computers. In other words, the process can be distributed between processor units on the same or different computers in a computer system. Further, the number of processor units 214 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, data aggregator 212 can operate to receive change data 204 formatted in a byte sequence that is used by target 208 of change data 204. As depicted, metadata 218 can be received with change data 204. In this illustrative example, metadata 218 describes change data 204. For example, metadata 218 can identify change operation 220 that is to be applied to change data 204. Change operation 220 can be, for example, add operation 222 or delete operation 224. In one example, if change data 204 comprises rows to be applied to a set of tables in target 208, each row can be associated with change operation 220, such as add operation 222 and delete operation 224.

In this example, metadata 218 can also be used to determine the boundaries of incoming data. In this example, metadata 218 can identify change data 204 as a separate piece of data from other data also received from source 206. For example, metadata 218 can include boundary 225 for change data 204 that is subject to change operation 220.

In other words, boundary 225 can identifies the size or extent of change data 204 to distinguishes change data 204 from other data received. In this illustrative example, change data 204 is a data object that can be, for example, a row, a file, a block of data, a record, or some other type of data object. With boundary 225, data aggregator 212 does not need any knowledge of what type of data object as being handled. Further, metadata 218 can indicate how much of a row in change data 204 is needed to uniquely identify the row in change data 204.

Data aggregator 212 stores change data 204 in region 226 in buffer system 228. In this example, buffer system 228 comprises add buffer 230 and delete buffer 232. In this illustrative example, change data 204 is stored by data aggregator 212 in region 226 in add buffer 230 in buffer system 228 in response change data 204 being for add operation 222. As depicted, data aggregator 212 stores change data 204 in region 226 in delete buffer 232 when change operation 220 for change data 204 is delete operation 224.

In this illustrative example, in addition to storing change data 204, data aggregator 212 also stores information about change data 204 in index system 234. Index system 234 comprises a set of indexes that store information about change data 204 stored in buffer system 228.

For example, data aggregator 212 stores unique identifier 236 for change data 204 in location 238 of region 226 within buffer system 228. As depicted, this information can be stored in index system 234. Unique identifier 236 can take a number of different forms. In one illustrative example, unique identifier 236 is a hash value calculated from a hash of bytes in change data 204. The number of bytes use can be those bytes make change data 204 unique. As a result, not all of change data 204 needs to be hashed to a hash value for unique identifier 236. For example, if change data 204 is a row, the first three columns for the row may be sufficient to generate a hash value for unique identifier 236. In other illustrative examples, all of row for change data 204 can be used.

In the illustrative example, other types of identifiers can be used in place of a hash value for unique identifier 236. For example, an alphanumeric string can be assigned to change data 204. In another example, unique identifier 236 can be the address of source 206 with a timestamp and a random value.

Location 238 identifies whether region 226 is located in add buffer 230 or delete buffer 232. Further, location 238 identifies the location of region 226 within a buffer. For example, location 238 can include an offset from the beginning the buffer to the beginning of region 226 and an offset to the end of region 226. As another example, location 238 can include an offset from the beginning of the buffer to the beginning of region 226 and a length or size of change data 204 stored in region 226. In this illustrative example, stored change data 242 is previously stored change data in regions 244 located in at least one of add buffer 230 or delete buffer 232.

In the depicted example, data aggregator 212 determines whether collision 240 is present between the change data 204 received from source 206 and stored change data 242 in add buffer 230 in response to change data 204 being for delete operation 224. In this example, the comparison is with stored change data 242 found in a set of regions 244 in add buffer 230.

In this illustrative example, collision 240 is present when change data 204 matches stored change data 242. For example, if change data 204 is a row, collision 240 is present if the same row is found in stored change data 242. When this situation is present, stored change data 242 that is added and then deleted does not need to be sent to target 306. This feature is a net effect aggregation feature that can reduce the amount of bandwidth needed to send stored change data 242 to target 208.

The determination as to whether collision 240 is present can be made by data aggregator 212 in a number of different ways. For example, data aggregator 212 can compare unique identifier 236 for change data 204 with stored unique identifiers 246 in index system 234. In this example, stored unique identifiers 246 include unique identifiers that correspond to regions 244 of stored change data 242 in add buffer 230. For example, when unique identifiers take the form of hash values, the hash value for change data 204 can be compared with the hash values for stored change data 242 in regions 244 located in add buffer 230.

In response to a match being present between unique identifier 236 and a stored unique identifier 248, data aggregator 212 compares change data 204 with stored change data 242 corresponding to stored unique identifier 248 in response to unique identifier 236 matching stored unique identifier 248 for stored change data 242 to determine whether the collision is present. For example, when stored change data 242 takes the form of a row, the row for change data 204 can be compared to the row for stored change data 242 located in region 226 identified by stored unique identifier 248.

In this illustrative example, in response to collision 240 being present, data aggregator 212 flags locations of stored change data 242 that match change data 204. For example, data aggregator 212 can store collision location 250 for region 226 in add buffer 230 containing stored change data 242 identified in collision 240. This collision location is stored in index system 234 in this example, The identification of a region having a collision can be used to omit that region from being transmitted to target 208.

In other words, the collision location can identify what portion of stored change data 242 should not be sent to target 208 with that portion of stored change data 242 being located in region 226 as identified by stored unique identifier 248. In this illustrative example, collision location 250 include an offset to the beginning of region 226 and an offset to the end of region 226.

In this illustrative example, stored change data 242 in regions 244 in buffer system 228 can be sent to target 208 when stored change data 242 is ready to be sent. Data aggregator 212 can determine when stored change data 242 is ready to be sent can be triggered by event 252. Event 252 can take a number of different forms. For example, event 252 can be the passing of a period of time, detecting a transaction boundary, the amount of data in buffer system 228 exceeding a threshold, a user input, receiving a request from target 208, or some other suitable event.

In this illustrative example, data aggregator 212 sends stored change data 242 located in regions 244 in buffer system 228. Stored change data 242 includes stored change data 242 in regions 244 located in both add buffer 230 and delete buffer 232. In sending stored change data 242, data aggregator 212, data aggregator 212 omits stored change data 242 subject to collisions 254. For example, data aggregator 212 sends stored change data 242 in regions 244 in add buffer 230 in which a set of collisions 254 is absent to target 208 in response when stored change data 242 is to be applied to target 208. Data aggregator 212 also sends stored change data 242 in regions 244 in delete buffer 232 in which the set of collisions 254 is absent to target 208.

For example, in sending stored change data 242, data aggregator 212 determines whether a threshold has been reached for buffer system 228. In other words, a determination is made as to whether the amount of stored change data 242 stored in buffer system 228 is greater than some threshold amount.

Data aggregator 212 identifies stored change data 242 to be omitted from add buffer 230 and delete buffer 232 based on a set of the regions 244 identified as having the set of collisions 254 using collision locations. In this illustrative example, a collision can have two collision locations. One collision location can be for stored change data in add buffer 230 and the other collision location can be for the corresponding stored change data in delete buffer 232.

As a result, data aggregator 212 sends stored change data 242 in delete buffer 232 and stored change data 242 in add buffer 230 that is not identified for omission to the target 208. Additionally, data aggregator 212 can send metadata 256 indicating stored change data 242 to be deleted from target 208 and stored change data 242 to be added to target 208.

Additionally, data aggregator 212 can employ checkpointing 263. For example, data aggregator 212 can store checkpoint 258 in index system 234. In this illustrative example, checkpoint 258 identifies end of transaction 265 in buffer system 228. Further, checkpoint 258 can also include information identifying regions 244 for the set of collisions 254 occurring up to end of transaction 265. In this illustrative example, end of transaction 265 corresponds to a transaction boundary or some other type of consistency point.

With a checkpoint feature, data aggregator 212 can receive request 262 to roll back buffer system 228 to checkpoint 258. Data aggregator 212 identifies a set of collisions 254 detected prior to checkpoint 258. In this example, the set of collisions 254 can be a null set, meaning no collisions are present.

In this example, data aggregator 212 identifies stored change data 242 to be omitted in add buffer 230 and delete buffer 232 in buffer system 228 based on regions 244 identified as having the set of collisions 254 detected prior to checkpoint 258. When a collision is present, regions 244 are for the collision between stored change data 242 in add buffer 230 and delete buffer 232. For example, the region of a row in add buffer 230 has a corresponding region for the same row in delete buffer 232 for the collision between these add and delete operation for the row.

Data aggregator 212 sends stored change data 242 ending at checkpoint 258 in add buffer 230 and delete buffer 232 that is not identified for omission; and the stored change data in delete buffer 232 to target 208.

In one illustrative example, one or more technical solutions are present that overcome a technical problem with performance issues in scaling the amount of data aggregated. As a result, one or more solutions in the illustrative example may enable using buffers located in secondary storage such as a desk in addition to memory. One or more solutions in the illustrative example employs indexing, write-once, non-destructive deletes, and region views of data in buffers in buffer system 228. In other words, data is not deleted from buffers in buffer system 228. This type of data accumulation also enables checkpoint to roll back to a prior or point in time when sending stored change data 242.

For example, when a new transaction has many more bytes of data than prior transactions, data aggregator 212 can roll back to a prior checkpoint and send already aggregating data without waiting to detect a transaction boundary for the end of the current transaction. Further, with a write-once process, the use of secondary storage in addition to memory can be used without performance penalties encountered by current techniques.

Computer system 210 can be configured to perform at least one of the steps, operations, or actions described in the different illustrative examples using software, hardware, firmware or a combination thereof. As a result, computer system 210 operates as a special purpose computer system in which data aggregator 212 in computer system 210 enables aggregating data with increased efficiency and in a scalable manner. In particular, data aggregator 212 transforms computer system 210 into a special purpose computer system as compared to currently available general computer systems that do not have data aggregator 212.

In the illustrative example, the use of data aggregator 212 in computer system 210 integrates processes into a practical application for method that increases the performance of computer system 210. In other words, data aggregator 212 in computer system 210 is directed to a practical application of processes integrated into data aggregator 212 in computer system 210 for aggregating data using a write-once process. In this illustrative example, data aggregator 212 in computer system 210 enables using slower storage in addition to memory without performance issues encountered by current techniques. Data aggregator 212 also enables checkpointing when determining what change data to send to a target. In this manner, data aggregator 212 in computer system 210 provides a practical application of aggregating data such that the functioning of computer system 210 is improved.

The illustration of data aggregation environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, although a single add buffer in a single delete are shown in buffer system 228 multiple and buffers and multiple delete buffers can be used in aggregating change data 204 to send to target 208. As another example, although a single source is depicted, change data 204 can be directed to target 208. In another illustrative example, change data 204 can be sent one or more targets in addition to or in place of target 208. With multiple targets, each target can be assigned a buffer system or a set of delete buffers and a set of add buffers. As yet another example, change operation 220 can also be update operation in addition to add operation 222 and delete operation 224. An update operation involves deleting and adding change data.

Figure 3:
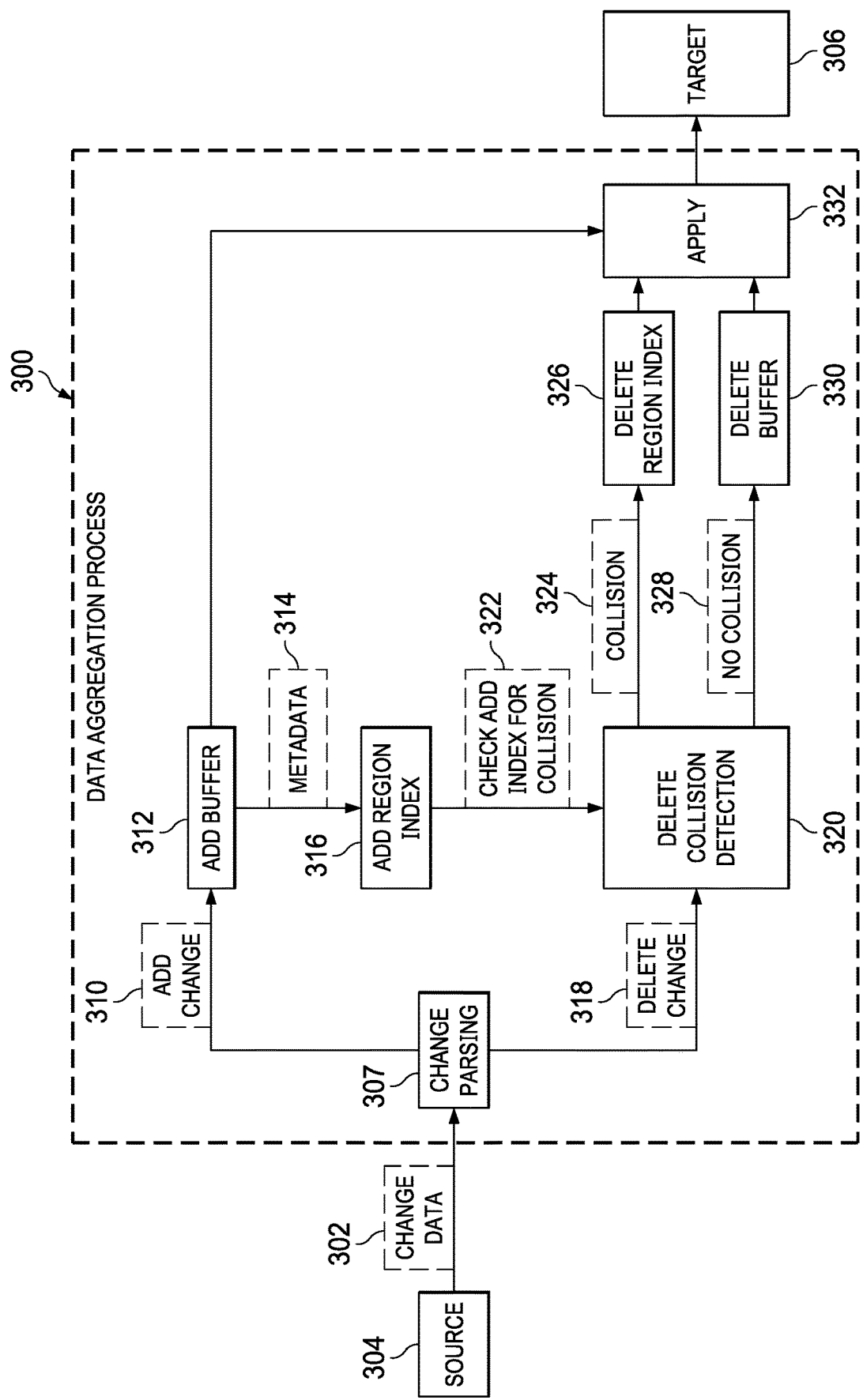
FIG. 3 is dataflow for aggregating change data in accordance with an illustrative embodiment.

With reference next to FIG. 3, dataflow for aggregating change data is depicted in accordance with an illustrative embodiment. Data aggregation process 300 is an example of a net effect aggregation process that can be implemented using data aggregator 212 in FIG. 2.

In this illustrative example, data aggregation process 300 can receive change data 302 from source 304 and aggregate change data 302 send to target 306. In this example, change data 302 are applied to a row in a relational database management system table. In this illustrative example, the key is all of the columns in the table. The transaction this example is a logical grouping of at least one of changes or operations. Operations or updates such as update, insert, or delete. The update is broken into a corresponding delete followed by an insert for a row of data.

As depicted, change parsing 307 in data aggregation process 300 processes change data 302 for the row to determine how to handle change data 302. Change parsing 307 identifies information about change data 302. This information includes, for example, the type of operation to be performed, a transaction identifier, and suitable information. The change operation in change data 302 received from source 304 can be an insert or delete for a row of data in this particular example.

If the operation is an insert, add change 310 in change data 302 the data representing add change 310 is written to add buffer 312. Additionally, metadata 314 obtained from add change 310 is used to add the row to add region index 316. Metadata 314 can be manifested in many ways. A frequently encountered exemplar is an indicator value in a header associated with the change.

In this depicted example, metadata 314 includes an offset into add buffer 312 at the beginning of the row, an offset to add buffer 312, a hash value of bytes making the change data 302 unique are saved. This information is saved as an entry in the add region index 316. The entry uses the hash value as a key and stores the offsets, identifying the beginning and end of the data in add buffer 312. If the entry made in add region index 316 is the last entry, the offset to the end of the region is recorded as the most recent consistency point for add buffer 312. This consistency point can be a transaction boundary. The consistency point is used for checkpointing.

If the change data 302 is identified being the delete change 318, delete collision detection 320 in data aggregation process 300 is performed. Delete collision detection 320 involves generating a hash value making the change data is unique or very likely to be unique. This hash value for delete change 318 is used by delete collision detection 320 to perform check add index for collision 322. The hash value for change data 302 is compared to the keys in the entries in add region index 316 for the rows of change data stored in add buffer 312.

In the event of a match in hash values, the actual row bytes for the deleted row in change data 302 is compared with the row in the change data stored in add buffer 312 that has the matching hash value. This check is performed to ensure equality. Hash collision on non-equal data is very rare but can happen. In this example, checking all the data ensures that the collision is real and not an artifact of a hash collision. Optionally, if the unique portion of the data in a row is sufficiently small, that unique portion can be cached in add region index 316 to avoid a lookup in add buffer 312.

When collision 324 is present, an entry is added to delete region index 326. This index is a metadata index containing information about collision 324. The entry can include the offset to the beginning of the row and offset to the end of the row in add buffer 312. In addition, delete region index 326 can also include an identification of the number of collisions that have been processed for the add buffer 312.

In this illustrative example, if the checkpointing feature is present, a data structure can hold the current delete row data or a transaction. In other words, this data can be held until the change data is sent to target 306. At that point this data can be overwritten.

When delete collision detection 320 results in no collision 328, change data 302 for the deletion in the row is written to delete buffer 330. If this change data is the last for a transaction, the offset to the end of the data for the row in delete buffer 330 is reported as the most recent consistency point for delete buffer 330. In this depicted example, the end of a transaction or transaction boundaries is used as a consistency point.

In this illustrative example, apply 332 in data aggregation process 300 send change data in add buffer 312 and delete buffer 330 to target 306. In this illustrative example, apply 332 can be send change data when a sufficient aggregation size has been reached or a time threshold has been passed. Thus, in this example, a net effect apply using data aggregation process 300 can be performed at a transaction boundary to maintain atomicity of transactions for target 306.

In this illustrative example, apply 332 considers regions omitted in add buffer 312 as a result of collisions. These omitted regions can be identified using collisions identified in delete region index 326. For example, data can be sent from the first region in add buffer 312 to offset identified in the first entry in delete region index 326 identifying a region with the collision. Change data in add buffer 312 is then sent from the start of the next region until the offset identified in next entry in delete region index 326. This process can be followed until all of the change data has been identified in add buffer 312 is sent. This change data omits change data from regions identified in delete region index 326 as having collisions.

In this illustrative example, apply 332 sends all of the change data in delete buffer 330. This occurs in this illustrative example because change data is only stored in delete buffer 334 delete changes when no collision 328 is present. When entries are not present in delete region index 326, all of the change data in add buffer 312 and delete buffer 330 is sent.

When checkpointing is used by apply 332, the portion of add buffer 312 is identified by apply 332 using delete region index 326 up to the last checkpoint that is to be applied. This checkpoint can be used when a current aggregation of data exceeds the maximum number of allowable bytes. This maximum number can be a limitation of target 306. In other examples, the consideration of latency may be used to send data before the current transaction is completed. In other words, if the amount of time needed to complete the current transaction is greater than desired, change data can be sent omitting change data from the current transaction. The change data sent also omits change data in regions in which collisions occur based on deletions in the prior transactions. Thus, if a deletion in the current transaction had a collision with change data in a prior transaction before the checkpoint, that collision is not taken into account when determining what data not to send.

With checkpointing, delete region index 326 is checked to determine whether collisions are present after the checkpoint for the current transaction. For example, delete region index 326 is examined to determine whether any entries for delete regions are part of the current transaction. If so, those entries are to be considered removed from delete region index 326 and an associated entry (possibly pre-generated during delete collision detection, or calculated based off the add row buffer bytes) is appended to the end of delete buffer 330 and thus beyond the most recent consistency point in delete buffer 330. In other words, some collisions can be undone when the deletion is present because of a deletion occurring in the current transaction after to the checkpoint. The change data in delete buffer 330 is sent to target 306 up to the last consistency point of delete buffer 330 as well as any "un-done" delete collision entries. Change data is written out of add buffer 312 if the consistency point was the end of the buffer.

Illustration of data aggregation process is provided as an illustrative example and not meant to limit the manner in which data aggregation processes can be implemented in other illustrative examples. For example, change data can be stored in delete buffer 330 even when a collision is present in other illustrative examples. As another example, add region index 316 and delete region index 326 can be implemented as a single index and other implementations.

Figure 4:
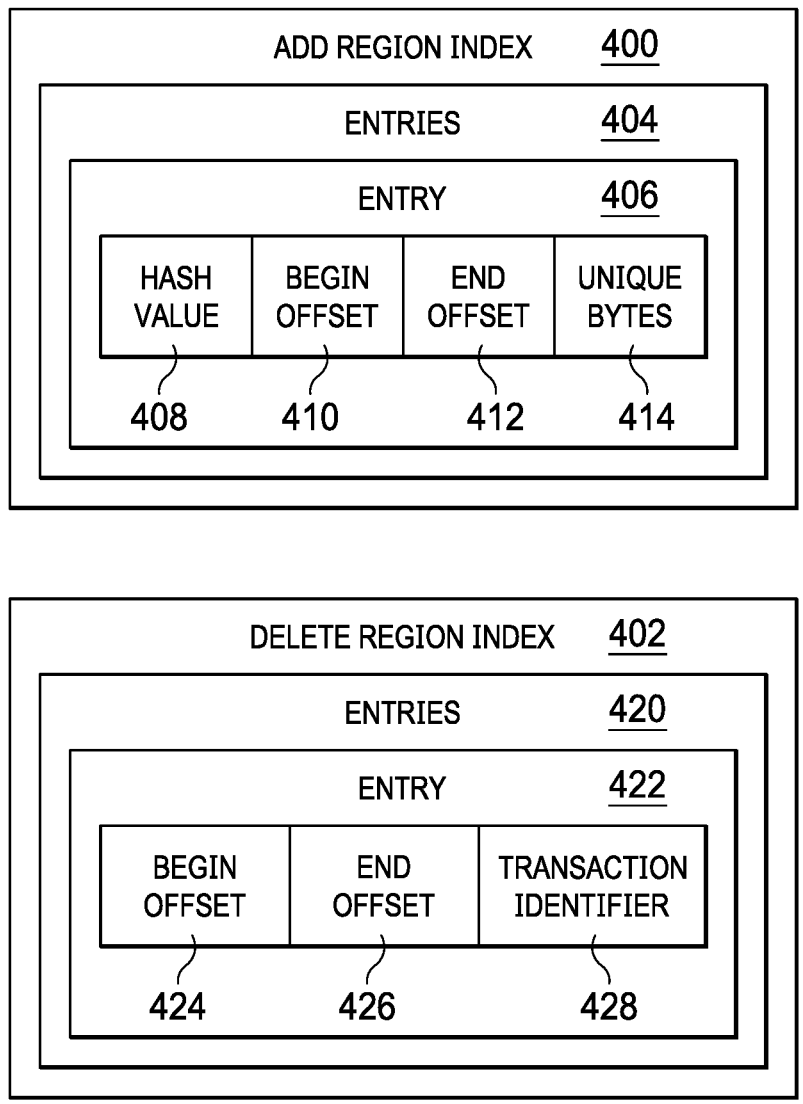
FIG. 4 are indexes in accordance with an illustrative embodiment.

With reference now to FIG. 4, indexes are depicted in accordance with an illustrative embodiment. In this illustrative example, add region index 400 and delete region index 402 are examples of indexes that can be used within index system 234 in FIG. 2. Further, add region index 400 is an example of add region index 316 in FIG. 3, and delete region index 402 is an example of delete region index 326 in FIG. 3.

As depicted, add region index 400 identifies the locations of regions containing stored change data in an add buffer and can be used to search for collisions with change data for delete operations. Each of these regions can correspond to a data object such as a row, a table, a file, or other data object. In this example, add region index 400 comprises entries 404. Each entry in entries 404 corresponds to a region within the add buffer and contains information about the stored change data located within the region.

For example, entry 406 comprises hash value 408, begin offset 410, and end offset 412. Hash value 408 is a unique identifier for the stored change data in the region corresponding to entry 406. This hash value also functions as a key or index for entry 404 within add region index 400.

As depicted, begin offset 410 identifies the start location of the region containing the stored change value. End offset 412 identifies the end location of the region containing the stored change value. These offsets identify the location of the region within an add buffer.

Further, entry 406 can optionally include unique bytes 414. Depending on the size of the data stored in the region, unique bytes 414 can also be included in entry 406 for use in comparison to determine if hash value 408 matches a hash value generated for change data for delete operation.

In this example, delete region index 402 identifies regions in an add buffer that are to be omitted when sending stored change data in the add buffer to a target for application to the target. As depicted, delete region index 402 comprises entries 420 containing information about collisions of stored change data in an add buffer with stored change data in an add buffer. These entries are examples of collision locations, such as collision location 250 in FIG. 2. For example, entry 422 in entries 420 comprises begin offset 424, and end offset 426, and transaction identifier 428.

In this example, begin offset 424 identifies the start location of the region containing the stored change value for deletion. End offset 426 identifies the end location of the region containing the stored change value. These offsets identify the location of the region within an add buffer. As a result, entries 420 can be used to generate a list of regions of regions that should not be sent from the add and delete buffers.

Transaction identifier 428 can be used to identify what transaction that the region in the add buffer is associated with. Transaction identifier 428 is the number of transactions that occurred since change data has been stored in the add buffer. In other words, transaction identifier 428 is not actual transaction number used by the source. This transaction identifier can be used for checkpointing. In other words, transaction identifier can be identifier to associate in entry with a particular checkpoint. Transaction identifier 428 can be used to indicate whether a particular collision is one that occurred after the checkpoint that is to be rolled back to or prior to the checkpoint.

The illustration of add region index 400 and delete region index 402 are provided as an example of one manner in which indexes can be implemented. This illustration is not meant to limit the manner in which other indexes can be implemented. For example, the location of regions can be identified using the beginning offset and a link or size of the data rather than to offsets. As another example, transaction identifiers identifying the transaction number of change data can be included in add region index 400 in other implementations.

Figure 5:
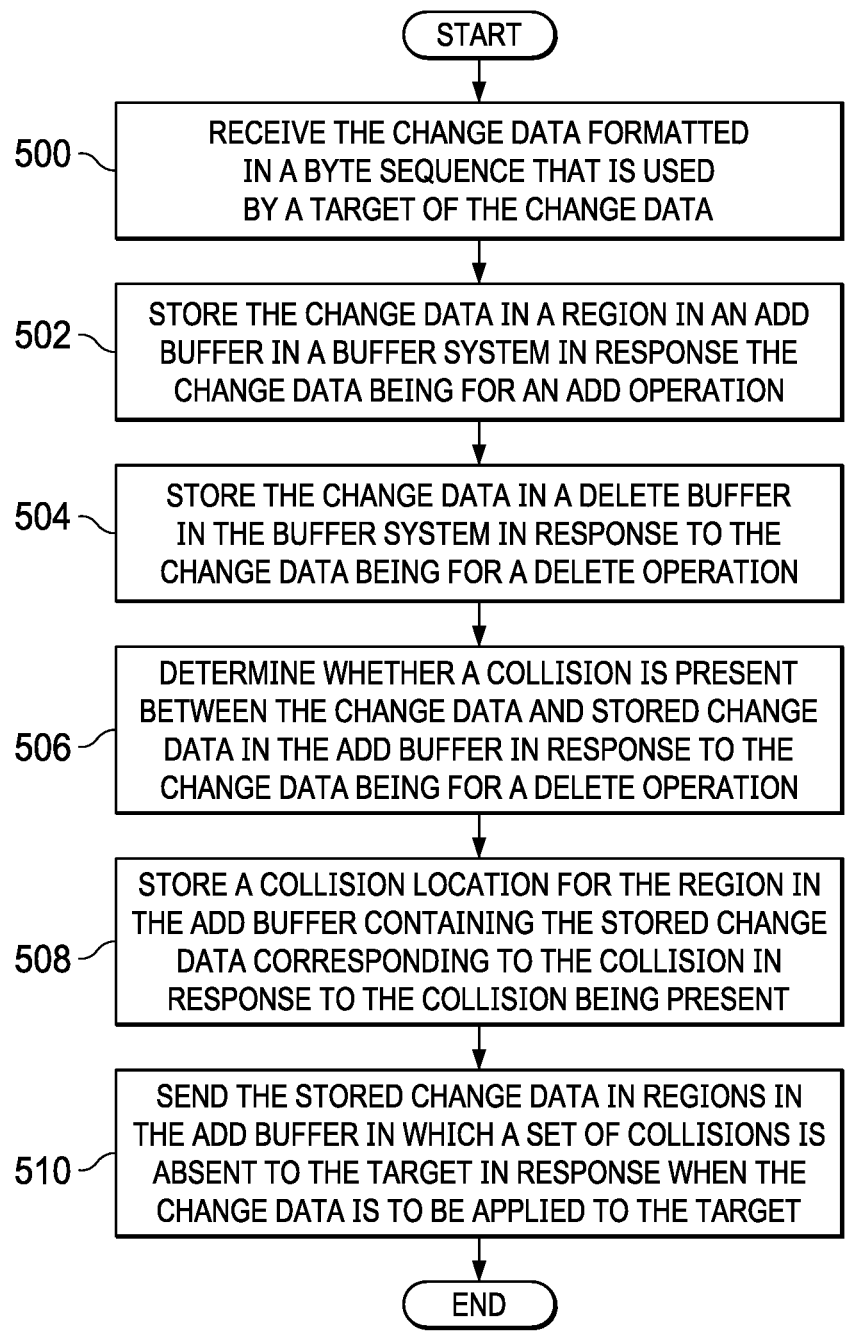
FIG. 5 is a flowchart of a process for aggregating change data in accordance with an illustrative embodiment.

Turning next to FIG. 5, a flowchart of a process for aggregating change data is depicted in accordance with an illustrative embodiment. The process in FIG. 5 can be implemented in hardware, software, or both. When implemented in software, the process can take the form of program instructions that is run by one of more processor units located in one or more hardware devices in one or more computer systems. For example, the process can be implemented in data aggregator 212 in computer system 210 in FIG. 2.

The process begins by receiving the change data formatted in a byte sequence that is used by a target of the change data (step 500). The process stores the change data in a region in an add buffer in a buffer system in response the change data being for an add operation (step 502). The process stores the change data in a delete buffer in the buffer system in response to the change data being for a delete operation (step 504).

The process determines whether a collision is present between the change data and stored change data in the add buffer in response to the change data being for a delete operation (step 506). The process stores a collision location for the region in the add buffer containing the stored change data corresponding to the collision in response to the collision being present (step 508).

The process sends the stored change data in regions in the add buffer in which a set of collisions is absent to the target in response when the change data is to be applied to the target (step 510). The process terminates thereafter.

Figure 6:
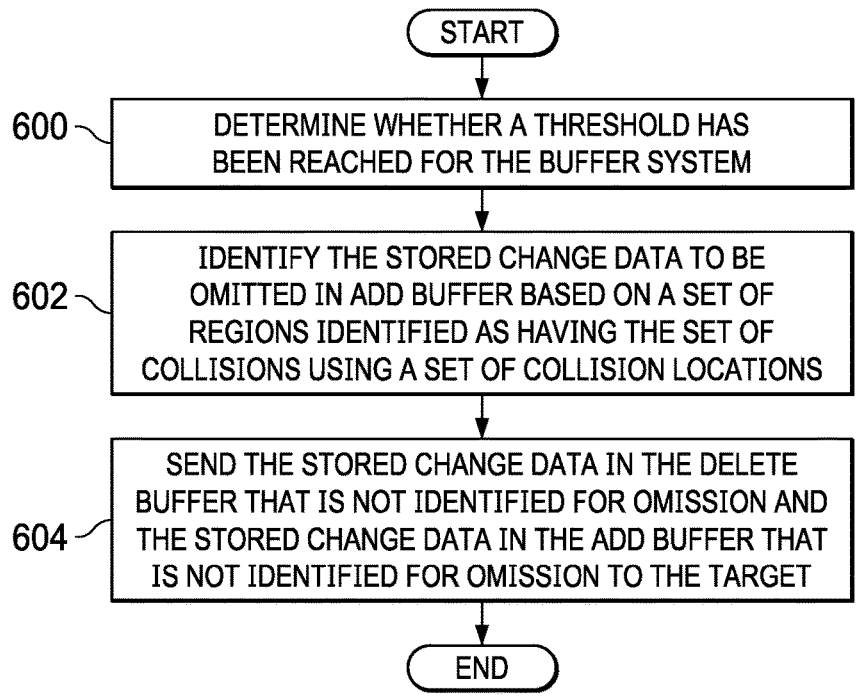
FIG. 6 is a flowchart of a process for sending stored change data in accordance with an illustrative embodiment.

Turning to FIG. 6, a flowchart of a process for sending stored change data is depicted in accordance with an illustrative embodiment. The step in this figure is an example of an implementation for step 510 in FIG. 5.

The process begins by determining whether a threshold has been reached for the buffer system (step 600). The process identifies the stored change data to be omitted in add buffer based on a set of regions identified as having the set of collisions using a set of collision locations (step 602).

The process sends the stored change data in the delete buffer that is not identified for omission and the stored change data in the add buffer that is not identified for omission to the target (step 604). The process terminates thereafter.

Figure 7:
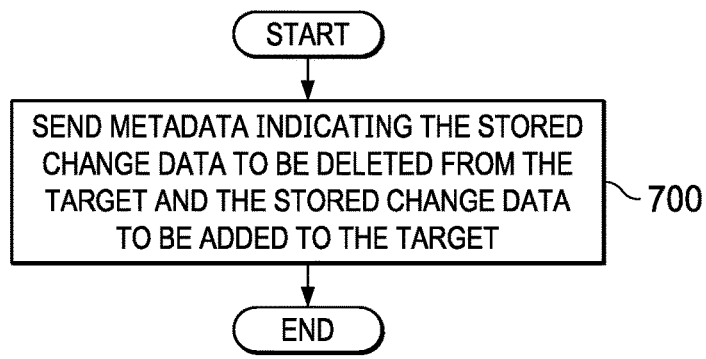
FIG. 7 is a flowchart of a process for sending aggregated change data in accordance with an illustrative embodiment.

In FIG. 7, a flowchart of a process for sending aggregated change data is depicted in accordance with an illustrative embodiment. The step in this figure can be performed in addition to the steps in FIG. 5.

The process sends metadata indicating the stored change data to be deleted from the target and the stored change data to be added to the target (step 700). The process terminates thereafter.

Figure 8:
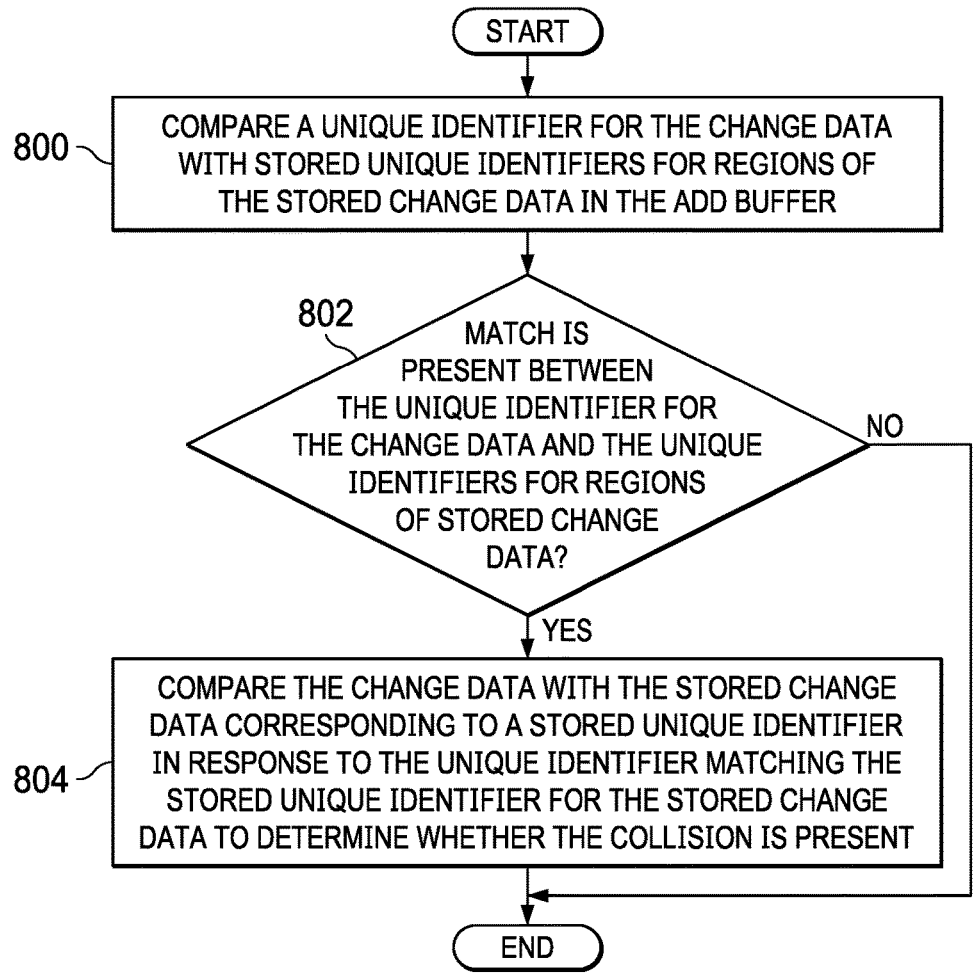
FIG. 8 is a flowchart of a process for determining whether the collision is present in accordance with an illustrative embodiment.

With reference next to FIG. 8, a flowchart of a process for determining whether the collision is present is depicted in accordance with an illustrative embodiment. The steps in this figure are an example of an implementation for step 506 in FIG. 5. In this flowchart, a comparison is made between the change data for a delete operation and the change data stored in add buffers for an add operation.

The process begins by comparing a unique identifier for the change data with stored unique identifiers for regions of the stored change data in the add buffer (step 800). In step 800, the unique identifier for the change data can be a hash of bytes in the change data that make the change data unique. The hash can be some or part of all the change data in a region. For example, the change data comprises rows of data in which each row is stored in a region. In this example, the hash can be for a portion of the rows that is sufficient to uniquely identify that row from other rows in the change data. In some illustrative examples, the hash can be generated for an entire row in the change data. In other illustrative examples, unique identifier could be some other type of identifier assigned to a row such as alphanumeric string. Any type of identifier can be used as long as the unique identifies each row.

A determination is made as to whether a match is present between the unique identifier for the change data and the unique identifiers for regions of stored change data (step 802). If a match is present, the process compares the change data with the stored change data corresponding to a stored unique identifier to determine whether the collision is present (step 804). In step 802, the stored unique identifier is one identifier in the unique identifiers for the regions of stored data that matches the unique identifier to the change data. The process terminates thereafter. If a match is present between the change data and stored change data, the collision is present between the change data to be deleted and corresponding change data to be added. With reference again to step 802, if a match is not present, the process terminates.

Figure 9:
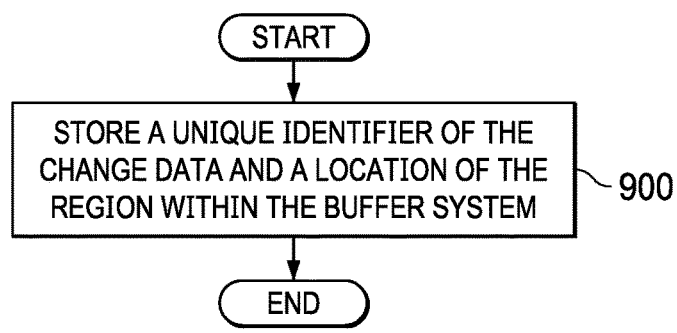
FIG. 9 is a flowchart of a process for aggregating change data in accordance with an illustrative embodiment.

Turning now to FIG. 9, a flowchart of a process for aggregating change data is depicted in accordance with an illustrative embodiment. The step in this figure can be performed in addition to the steps in FIG. 5.

The process stores a unique identifier of the change data and a location of the region within the buffer system (step 900). The process terminates thereafter. This unique identifier and location can be stored in an index and used in step 506 to determine whether the collision is present when change data is received. In this example, the unique identifier can be hash or other type of identifier that uniquely identifies the change data in the region.

Figure 10:
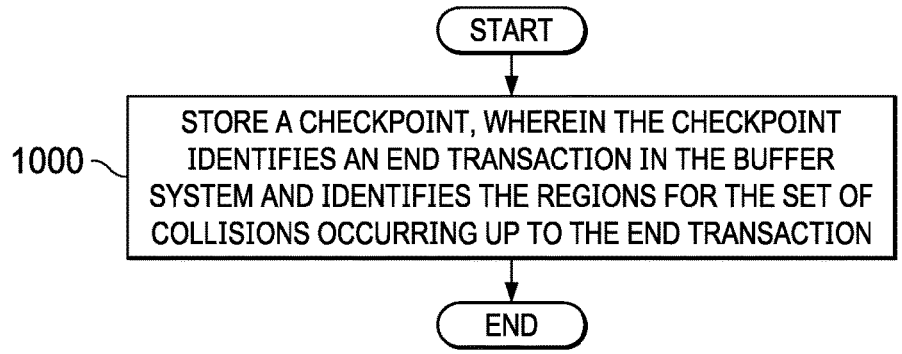
FIG. 10 is a flowchart of a process for checkpointing in accordance with an illustrative embodiment.

Turning now to FIG. 10, a flowchart of a process for checkpointing is depicted in accordance with an illustrative embodiment. The step in this figure can be performed in addition to the steps in FIG. 5.

Figure 11:
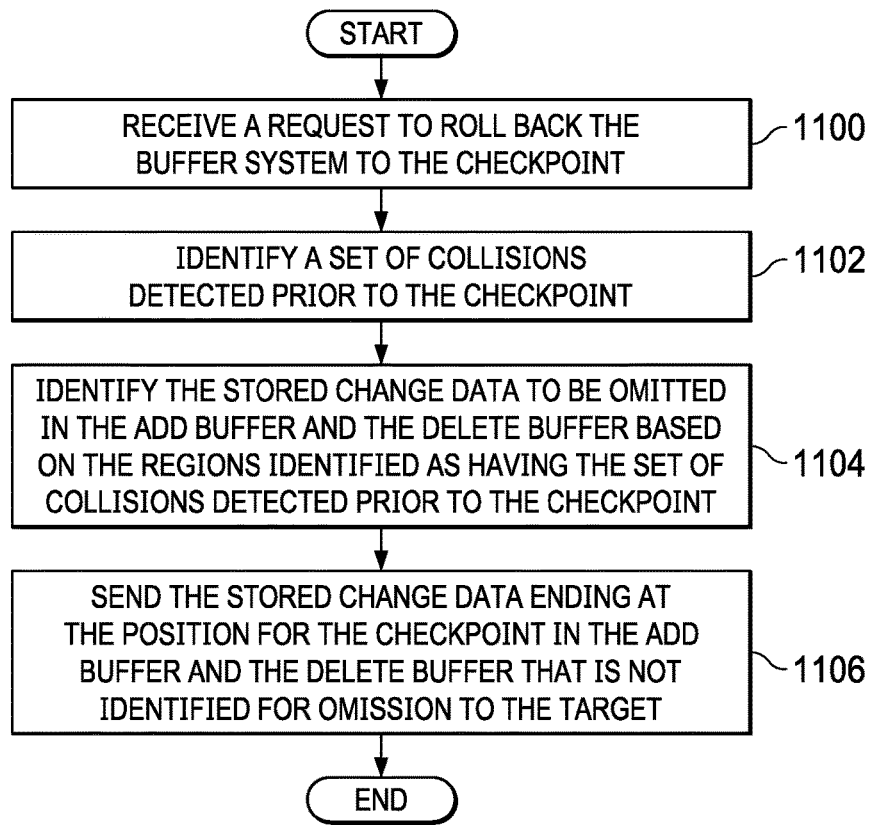
FIG. 11 is a flowchart of a process sending stored change data using a checkpoint in accordance with an illustrative embodiment.

The process stores a checkpoint, wherein the checkpoint identifies an end of a transaction in the buffer system and identifying a set of regions for the set of collisions occurring up to the end of the transaction (step 1000). The process terminates thereafter with reference to FIG. 11, a flowchart of a process sending stored change data using a checkpoint is depicted in accordance with an illustrative embodiment. The steps in this figure can be performed in addition to the steps in FIG. 5 using the checkpointing described in FIG. 10.

The process begins by receiving a request to roll back the buffer system to the checkpoint (step 1100). The process identifies a set of collisions detected prior to the checkpoint (step 1102). In step 1102, the set of collisions can be null set. In other words, no collisions may be present resulting set of collisions being zero.

The process identifies the stored change data to be omitted in add buffer based on the set of regions identified as having the set of collisions detected prior to the checkpoint (step 1104). The process sends the stored change data ending at the position for the check point in the add buffer and in the delete buffer that is not identified for omission to the target (step 1106). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program instructions, hardware, or a combination of the program instructions and hardware. When implemented in hardware, the hardware may, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

For example, step 504 in FIG. 5 can be an optional step that is omitted when a collision is present. For example, the process does not need to store the change data for deletion when a collision is present. The process in step 504 can store the change data in a delete buffer in the buffer system in response to the change data being for the delete operation and the collision being absent.

Figure 12:
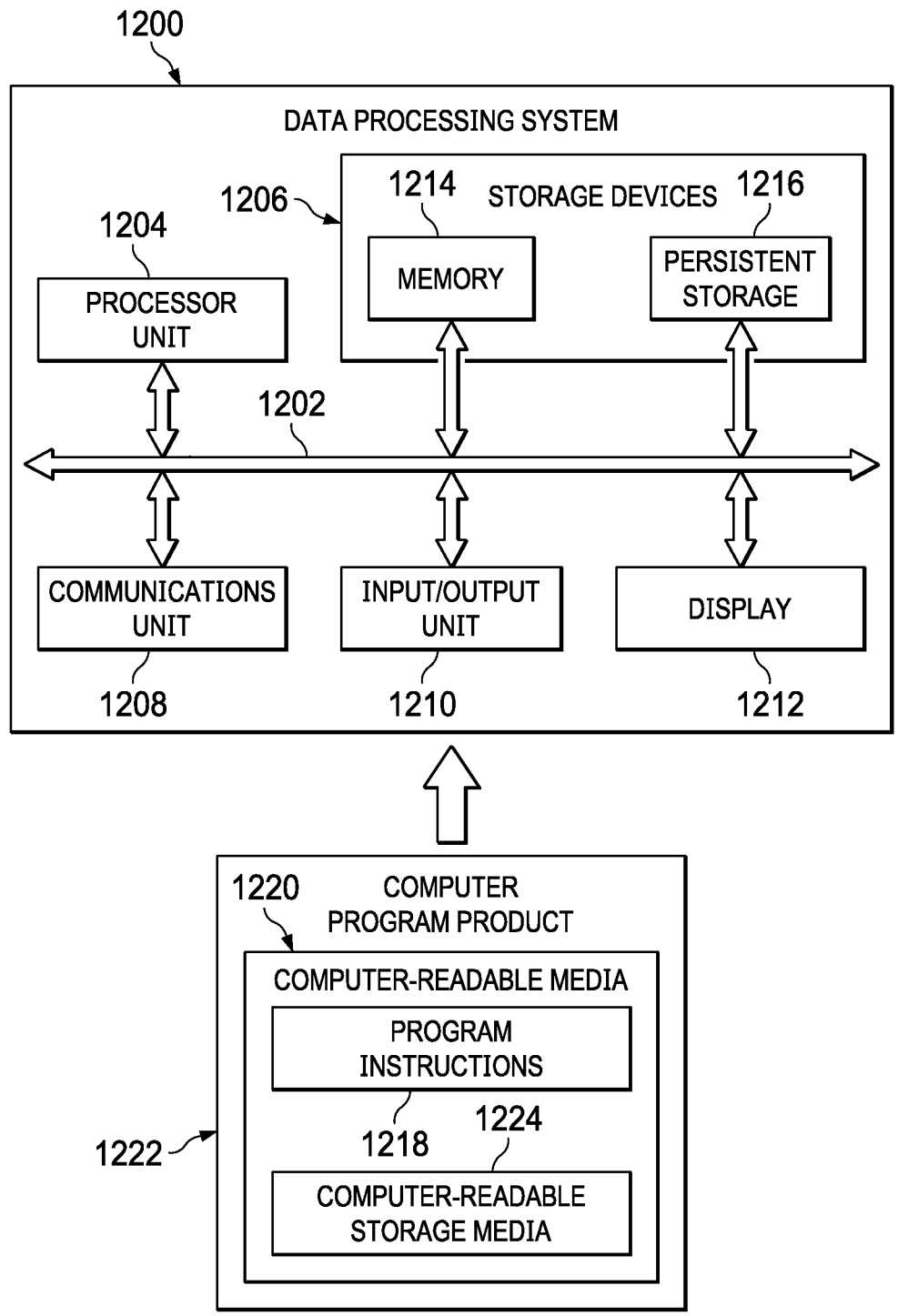
FIG. 12 is a block diagram of a data processing system in accordance with an illustrative embodiment.

Turning now to FIG. 12, a block diagram of a data processing system is depicted in accordance with an illustrative embodiment. Data processing system 1200 can be used to implement server computer 104, server computer 106, client devices 110, in FIG. 1. Data processing system 1200 can also be used to implement computer system 210 in FIG. 2. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 may take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which may be located in a memory, such as memory 1206.

These instructions are referred to as program instructions, computer usable program instructions, or computer-readable program instructions that can be read and executed by a processor in processor unit 1204. The program instructions in the different embodiments can be embodied on different physical or computer-readable storage media, such as memory 1206 or persistent storage 1208.

Program instructions 1218 is located in a functional form on computer-readable media 1220 that is selectively removable and can be loaded onto or transferred to data processing system 1200 for execution by processor unit 1204. Program instructions 1218 and computer-readable media 1220 form computer program product 1222 in these illustrative examples. In the illustrative example, computer-readable media 1220 is computer-readable storage media 1224.

Computer-readable storage media 1224 is a physical or tangible storage device used to store program instructions 1218 rather than a medium that propagates or transmits program instructions 1218. Computer-readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 1218 can be transferred to data processing system 1200 using a computer-readable signal media. The computer-readable signal media are signals and can be, for example, a propagated data signal containing program instructions 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program instructions 1218 can be located in computer-readable media 1220 in the form of a single storage device or system. In another example, program instructions 1218 can be located in computer-readable media 1220 that is distributed in multiple data processing systems. In other words, some instructions in program instructions 1218 can be located in one data processing system while other instructions in program instructions 1218 can be located in one data processing system. For example, a portion of program instructions 1218 can be located in computer-readable media 1220 in a server computer while another portion of program instructions 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, may be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program instructions 1218.

Thus, illustrative embodiments of the present invention provide a computer implemented method, computer system, and computer program product for aggregating change data. The change data formatted in a byte sequence that is used by a target of the change data is received. The change data is stored in a region in an add buffer in a buffer system in response the change data being for an add operation. A determination is made as to whether a collision is present between the change data and stored change data in the add buffer in response to the change data being for a delete operation. A collision location is stored for the region in the add buffer containing the stored change data corresponding to the collision in response to the collision being present. The stored change data in regions in the add buffer in which a set of collisions is absent is sent to the target in response when the change data is to be applied to the target.

Thus, one or more illustrative examples provide an ability to perform that aggregation with writing data once. In the illustrative examples, manipulation of buffers is unnecessary after individual writes of the change data into the buffers. The process in the depicted examples reduces the need for memory such as random access memory and can provide a desired level of performance using buffers backed by disk or other secondary storage. This ability to use disk is enabled through the use of writing data once to buffers during the aggregation process in contrast to current techniques that use net effect aggregation. In the illustrative examples, system overhead can be reduced during aggregation by removing memory cleanup of potentially large objects corresponding to the data of each operation. In the depicted examples, the regions in the buffers and entries in the index system are reusable during the process and data in the buffers can be overridden once the data is sent to the target.

The illustrative examples also enable checkpointing to provide a check pointing mechanism to select portions of the stored change data to be applied to a target. With check pointing, the amount of data sent to a target can be reduced to a threshold level by sending stored change data prior to a current transaction when the stored change data for current transaction exceeds a threshold. Further, if the processing of change data for current transaction is taking longer than desired for latency purposes, stored change data for prior transactions can be sent by using a checkpoint identifying the end of a prior transaction to the current transaction in the buffer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for aggregating received change data received from a source, the computer implemented method comprising:
    receiving, by a computer system from the source, the received change data formatted in a byte sequence that is used by a target of the received change data;
    storing, by the computer system in response to the received change data being for an add operation, the received change data in a region in an add buffer comprising a plurality of regions in a buffer system;
    determining, by the computer system in response to the received change data being for a delete operation, whether a collision is present between the received change data and stored change data stored in the add buffer;
    storing, by the computer system in response to the collision being present, a collision location for the region in the add buffer containing the stored change data corresponding to the collision that indicates an invalid region in the add buffer; and
    sending, by the computer system to the target, the stored change data in valid regions in the add buffer in which no collisions exist.

2. The computer implemented method of claim 1 further comprising:
    storing, by the computer system in response to the received change data being for the delete operation, the received change data in a delete buffer in the buffer system.

3. The computer implemented method of claim 2, wherein sending the stored change data comprises:
    determining, by the computer system, whether a threshold has been reached for the buffer system;
    identifying, by the computer system using collision locations, a portion of data in the stored change data in the add buffer to be omitted when subsequently sending the stored change data in the add buffer to the target based on invalid regions in the add buffer identified as having a set of collisions; and
    sending, by the computer system to the target responsive to determining the threshold has been reached, the stored change data in the add buffer that is not identified for omission.

4. The computer implemented method of claim 3, wherein sending the stored change data further comprises:
    sending, by the computer system, metadata indicating the stored change data to be added to the target.

5. The computer implemented method of claim 3 further comprising:
    storing, by the computer system, a checkpoint, wherein the checkpoint identifies an end of transaction in the buffer system and identifies the invalid regions for the set of collisions occurring up to the end of transaction.

6. The computer implemented method of claim 5, wherein sending the stored change data further comprising:
    receiving, by the computer system, a request to roll back the buffer system to the checkpoint;
    identifying, by the computer system, a set of collisions detected prior to the checkpoint;
    identifying, by the computer system, the stored change data to be omitted in the add buffer and the delete buffer based on the invalid regions identified as having the set of collisions detected prior to the checkpoint; and
    sending, by the computer system, the stored change data ending at the checkpoint in the add buffer and the delete buffer that is not identified for omission.

7. The computer implemented method of claim 1, wherein determining whether the collision is present comprises:
    comparing, by the computer system, a unique identifier for the received change data with stored unique identifiers for the regions of the stored change data in the add buffer; and
    comparing, by the computer system in response to the unique identifier matching the stored unique identifier for the stored change data, the received change data with the stored change data corresponding to a stored unique identifier to determine whether the collision is present.

8. The computer implemented method of claim 7, wherein the unique identifier for the received change data is a hash of bytes in the received change data that make the received change data unique.

9. The computer implemented method of claim 1 further comprising:
    storing, by the computer system, a unique identifier of the received change data and a location of the region within the buffer system.

10. A computer system configured to aggregate received change data received from a source, comprising:
    a number of processor units, wherein the number of processor units executes program instructions to:
    receive from the source the received change data formatted in a byte sequence that is used by a target of the received change data;
    store, in response to the received change data being for an add operation, the received change data in a region in an add buffer comprising a plurality of regions in a buffer system;
    store a unique identifier of the received change data and a location of the region within the add buffer;
    determine, in response to the received change data being for a delete operation, whether a collision is present between the received change data and stored change data stored in the add buffer;
    store, in response to the collision being present, a collision location for the region in the add buffer containing the stored change data corresponding to the collision that indicates an invalid region in the add buffer; and send to the target the stored change data in valid regions in the add buffer in which no collisions exist.

11. The computer system of claim 10, wherein the number of processor units executes program instructions to:

store, in response to the received change data being for the delete operation, the received change data in a delete buffer in the buffer system.

12. The computer system of claim 11, wherein in sending the stored change data, the number of processor units executes program instructions to:

determine whether a threshold has been reached for the buffer system;

identify, using collision locations, a portion of data in the stored change data in the add buffer to be omitted when subsequently sending the stored change data in the add buffer to the target based on invalid regions in the add buffer identified as having a set of collisions; and send, to the target responsive to determining the threshold has been reached, the stored change data in the add buffer that is not identified for omission.

13. The computer system of claim 12, wherein in sending the stored change data, the number of processor units executes program instructions to:

sending metadata indicating the stored change data to be added to the target.

14. The computer system of claim 12, wherein the number of processor units executes program instructions to:

store a checkpoint, wherein the checkpoint identifies an end of transaction in the buffer system and identifies the invalid regions for the set of collisions occurring up to the end of the transaction.

15. The computer system of claim 14, wherein in sending the stored change data, the number of processor units executes program instructions to:

receive a request to roll back the buffer system to the checkpoint;

identify a set of collisions detected prior to the checkpoint;

identify the stored change data to be omitted in the add buffer and the delete buffer based on the invalid regions identified as having the set of collisions detected prior to the checkpoint; and send the stored change data ending at the checkpoint in the add buffer and the delete buffer that is not identified for omission.

16. The computer system of claim 10 wherein in determining whether the collision is present, the number of processor units executes program instructions to:

compare a unique identifier for the received change data with stored unique identifiers for regions of the stored change data in the add buffer; and compare, in response to the unique identifier matching the stored unique identifier for the stored change data, the received change data with the stored change data corresponding to a stored unique identifier to determine whether the collision is present.

17. The computer system of claim 16, wherein the unique identifier for the received change data is a hash of bytes in the received change data that make the received change data unique.

18. The computer system of claim 10, wherein the number of processor units executes program instructions to:

store a unique identifier of the received change data and a location of the region within the buffer system.

19. A computer program product for aggregating received change data received from a source, the computer program product comprising a computer readable storage medium having a program instructions embodied therewith, the program instructions executable by a computer system to cause the computer system to perform a method of:

receiving, by the computer system from the source, the received change data formatted in a byte sequence that is used by a target of the received change data;

storing, by the computer system in response to the received change data being for an add operation, the received change data in a region in an add buffer comprising a plurality of regions in a buffer system;

storing, by the computer system, a unique identifier of the received change data and a location of the region within add buffer;

determining, by the computer system in response to the received change data being for a delete operation, whether a collision is present between the received change data and stored change data stored in the add buffer;

storing, by the computer system in response to the collision being present, a collision location for the region in the add buffer containing the stored change data corresponding to the collision that indicates an invalid region in the add buffer; and sending, by the computer system to the target in response when the stored change data is to be applied to the target, the stored change data in valid regions in the add buffer in which no collisions exist.

20. The computer program product of claim 19 further comprising:

storing, by the computer system in response to the received change data being for the delete operation, the received change data in a delete buffer in the buffer system, wherein sending, by the computer system, the stored change data comprises:

determining, by the computer system, whether a threshold has been reached for the buffer system;

identifying, by the computer system using collision locations, a portion of data in the stored change data in the add buffer to be omitted when subsequently sending the stored change data in the add buffer to the target based on invalid regions in the add buffer identified as having a set of collisions; and sending, by the computer system to the target responsive to determining the threshold has been reached, the stored change data in the add buffer that is not identified for omission.

* * * * *